(12) United States Patent
Miyamoto

(10) Patent No.: US 6,223,246 B1
(45) Date of Patent: Apr. 24, 2001

(54) COMPUTER SYSTEM HAVING AN INTERRUPT HANDLER

(75) Inventor: Hironobu Miyamoto, Kanagawaken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/219,790

(22) Filed: Dec. 23, 1998

(30) Foreign Application Priority Data

Dec. 24, 1997 (JP) .................................... 9-355391

(51) Int. Cl.[7] .................................................. G06F 13/24
(52) U.S. Cl. ........................... 710/261; 710/263; 710/266
(58) Field of Search .................................. 710/261–263, 710/266–269

(56) References Cited

U.S. PATENT DOCUMENTS

| | | | |
|---|---|---|---|
| 5,771,374 | * | 6/1998 | Burshtein et al. .................. 713/557 |
| 5,790,872 | * | 8/1998 | Nozue et al. ........................ 710/267 |
| 5,850,555 | * | 12/1998 | Qureshi et al. ..................... 710/260 |
| 5,857,108 | * | 1/1999 | Hong ................................... 710/260 |
| 5,875,341 | * | 2/1999 | Blank et al. ........................ 710/260 |
| 5,894,577 | * | 4/1999 | MacDonald et al. ............... 710/260 |
| 6,003,109 | * | 12/1999 | Caldwell et al. ................... 710/262 |

* cited by examiner

Primary Examiner—Robert Beausoleil
Assistant Examiner—Raymond Phan
(74) Attorney, Agent, or Firm—Oblon, Spivak, McClelland, Maier & Neustadt, P.C.

(57) ABSTRACT

Referred to is a flag pattern in an interrupt activation condition flag storing unit which stores an event as an interrupt activation condition flag. As a result thereof, it is determined whether or no the flag pattern exists in an operational key description storing unit which stores the position for the operation corresponding to the flag pattern n the interrupt activation condition flag storing unit. As a result of the determination, an interrupt process is performed in accordance with an operational description storing unit which stores a process corresponding to the flag pattern if the pattern exits. Thereafter, bit for the flag corresponding to the executed process is cleared out.

14 Claims, 8 Drawing Sheets

INTERRUPT ACTIVATION CONDITION FLAG 1

INTERRUPT ACTIVATION CONDITION FLAG 1

FIG. 6

| | | |
|---|---|---|
| 16 | | |
| DL | flg001 | : Address of interrupt process corresponding to interrupt flag pattern 001 |
| | flg010 | : Address of interrupt process corresponding to interrupt flag pattern 010 |
| | flg011 | : Address of interrupt process corresponding to interrupt flag pattern 011 |
| | flg100 | : Address of interrupt process corresponding to interrupt flag pattern 100 |
| | flg101 | : Address of interrupt process corresponding to interrupt flag pattern 101 |
| | flg110 | : Address of interrupt process corresponding to interrupt flag pattern 110 |
| | flg111 | : Address of interrupt process corresponding to interrupt flag pattern 111 |

```
flg110:                    ; Interrupt process corresponding to the interrupt flag pattern 110
        LD    A, (INTELG)  ; Check on flag pattern
        CP    A, 0x06
        JP    NZ, INTEND   ; Interrupt is terminated if a flag pattern is not the assumed flag pattern
        CALL  REQMSG       ; Request to resend the message
        CALL  RELTOPMSG    ; Remove the head of queue
        CALL  INSTOPMSG    ; Insert the resent message to the head of queue
        AND   A, 0xF9      ; Reset the flag corresponding to the process
        LD    (INTELG), A
INTEND:
        RETI               ; Return from interrupt flg100                     ; Interrupt process corresponding to the interrupt flag pattern 100
        RETI               ; Return from interrupt
```

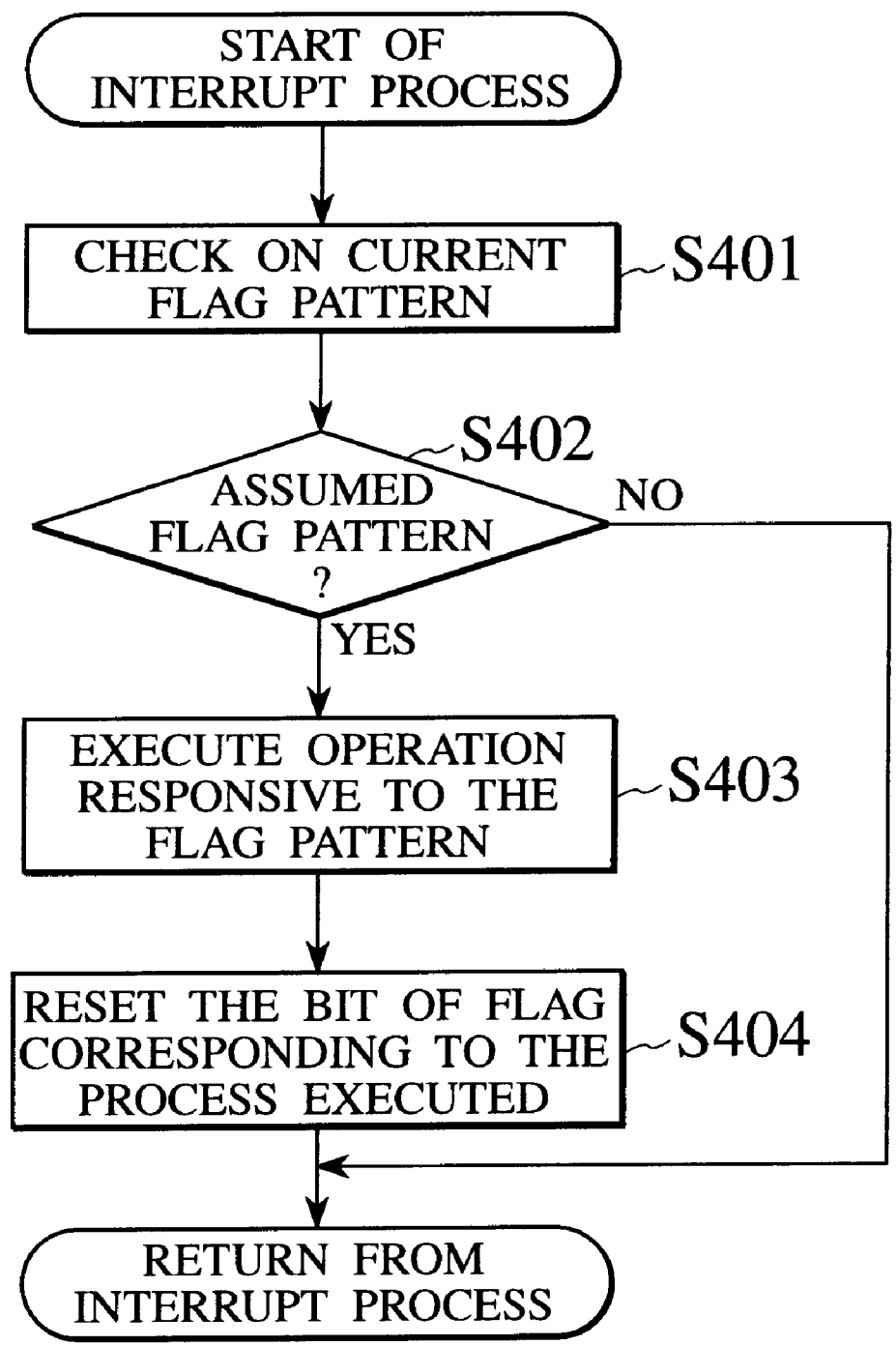

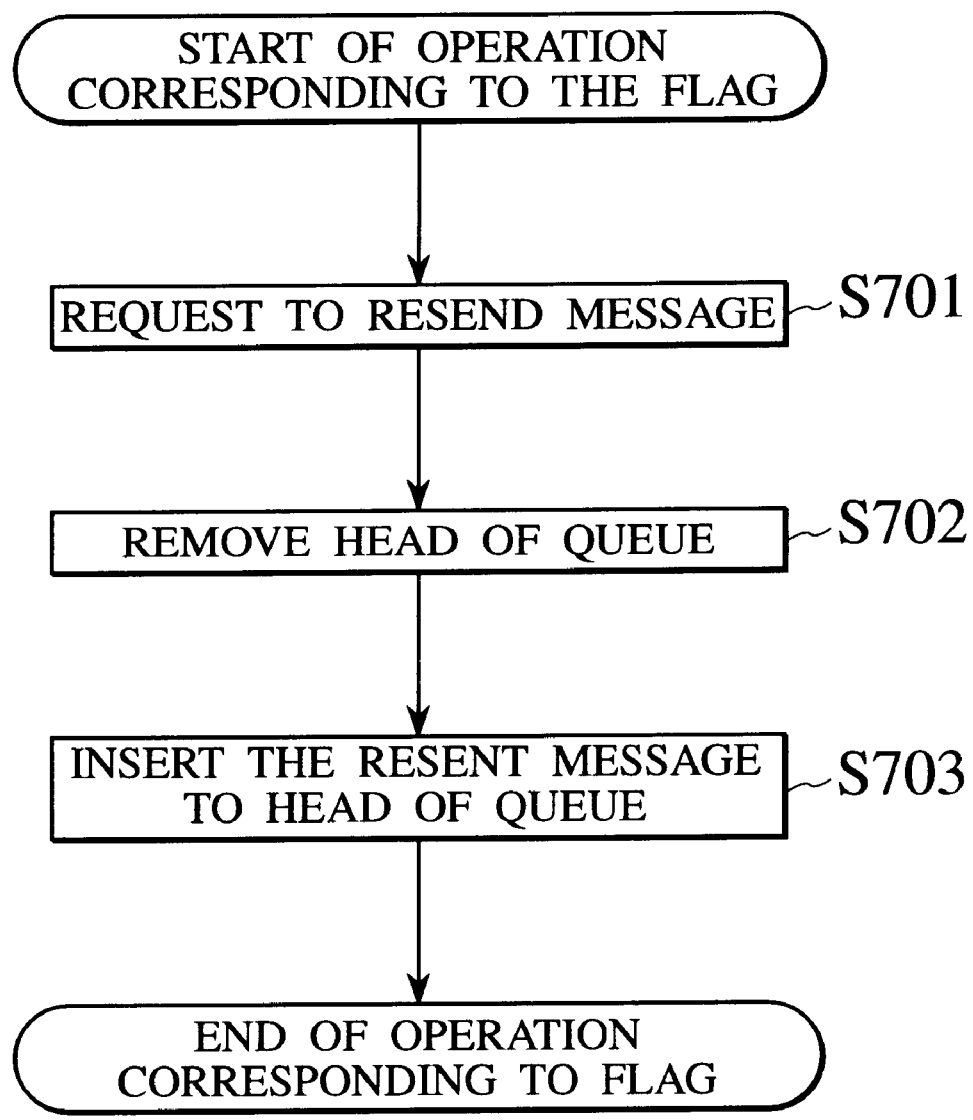

COMPUTER SYSTEM HAVING AN INTERRUPT HANDLER

BACKGROUND OF THE INVENTION

1. Field of the Invention

The present invention relates to a computer system having an interrupt processing capability and more particularly to a computer system having an interrupt process capability therein independent of an operating system (hereinafter may be referred to as OS).

2. Description of Related Art

When the application system executed by microprocessors or the like becomes very large-scaled, there may be necessitated an exceptional process therefor. However, the performance of an OS and tasks managed by the OS is statically determined by the specifications of the real-time OS, thus it is rather difficult to change the predetermined performance. Moreover, it may become necessitated that some additional features be added to the application program. For example, a message in the midst of a message queue managed by the OS need be transferred to a task under a certain specific condition without contents of the task being altered. In such a case, the OS according to the related art does not allow for the message to be transferred to the task ignoring the order of transfer stored in the queue.

FIG. 1 is a block diagram showing a configuration example of related-art computer system. Referring to FIG. 1, a control unit 22 performing various processes is connected to a communication medium 21. The control unit 22 executes a real-time OS 3 and thus executes application programs such as a task $4_1$ through $4_n$. Data 51, data 52, data 53 and so on are stored in the message queue 23 in the control unit 22. Task 41 receives data transmitted from a task which is being executed in another control unit (not shown), by way of the communication medium 21. The real-time OS 3 is managed in such a manner that the data transferred is stored to the message queue 23. How to manage the messages varies depending on the specifications of the real-time OS 3 in question. For example, the messages are managed and ordered in a first-in first-out (FIFO) fashion.

Referring to FIG.1, the FIFO method is carried out as follows: The real-time OS 3 receives a message request from among tasks $4_1$ through $4_n$. Assume now for convenience that the task $4_1$ requests a message. Then, the real-time OS 3 hands over data to the requesting task $4_1$ in the order in which the message is received by the real-time OS 3. If there exists undefined data which requires an interrupt process, the real time OS 3 and task $4_1$ perform as follows (see FIG. 2).

FIG. 2 is a flow chart showing processes of the real-time OS 3 and task when there exists, among messages requested by the task, an undefined datum which requires the interrupt process. Referring to FIG. 2, the task $4_1$ requests the real-time OS 3 to re-send a message to the effect that the message received from the real-time OS 3 is not what the task $4_1$ requested, that is, an undefined datum. Then, the real-time OS 3 performs a message re-sending process (STEP S901). Next, the real-time OS 3 adds a message obtained as a result thereof to the tail of a message queue 23 (STEP S902). Next, the real-time OS 3 removes a message in the head of the message queue 22 (STEP S903). Next, the task $4_1$ determines whether or not the removed message is the one requested to be re-sent (STEP S904). When the removed message is found to be the one requested to be re-sent, the real-time OS 3 transfers the re-sent message to the task $4_1$ (STEP S905). When the STEP S904 determines that the removed message is not the one requested to be re-sent, the process returns to STEP S902 for another processing.

If there are many messages stored in the message queue 23, performing such a process mentioned above takes time such that the processing time increases proportional to the number of messages stored. It takes time until the task receives the message which is requested to be re-sent, thus deteriorating the responsibility of computer system.

Moreover, it is not possible for the task to predict in advance how many messages are put in the message queue 23. It is also not possible to predict the degree to which the responsibility is deteriorated thereby.

Accordingly, in the computer system according to the related art, the development of another extra operating system is needed in order that an exceptional procedure can be achieved to change the OS and task. On the other hand, the task related thereto need be changed if the task is to be changed without implementing the extra operating system. Thus, the amount of tasks to be changed becomes enormous, thus deteriorating productivity of software therefor.

Moreover, various events occur as the application program becomes huge. Thereby, it becomes necessary to carry out a process responsive to each condition due to combination of the events, so that the event management becomes complicated.

Moreover, the increased processing time is required to recognize such conditions. Consider a case where limited is the time required for carrying out the process responsive to certain condition after the event such as a message re-sending request occurs. In this case, the increase in processing time not only results in deterioration of responsibility but also may cause a fatal outcome, for example, in terms of safety in an application system where a system need be stopped to secure safety in the event that a certain condition occurs.

SUMMARY OF THE INVENTION

In view of the foregoing drawbacks, it is therefore an object of the present invention to provide a computer system as wells as a control method therefor capable of handling exceptional procedures by performing interrupt processes with desirable responsibility so that making changes in the operating system and tasks are avoided and a simple configuration is achieved.

According to one preferred embodiment of the present invention, there is provided a control method for the computer system having interrupt capability therein, comprising the steps of: referring to at least one flag pattern in an interrupt activation condition flag storing unit which stores an event as an interrupt activation condition flag; thereafter determining whether or not the flag pattern exists in an operational key description storing unit which stores the position for the operation corresponding to the flag pattern in the interrupt activation condition flag storing unit; performing the interrupt process based on an operational description storing unit which stores a process corresponding to the flag pattern, in the event that there exists such the flag pattern as a result of the determining step; and thereafter resetting a bit of the flag corresponding to the process executed.

According to the configuration realizing such a control method, a flag operation is carried out in accordance with an event that occurs such that the interrupt process is performed responsive to this flag pattern. Thereby, making undue changes in the operating system as well as in tasks such as an application program are avoided so as to achieve a simple configuration. Thus, exceptional procedures can be handled by the interrupt processes with desirable responsibility.

BRIEF DESCRIPTION OF DRAWINGS

The objects, features and advantages of the present invention will become more apparent from the following description of the preferred embodiment taken in conjunction with the accompanying drawings, in which:

FIG. 6 is an example of an operational key description storing unit a unit 16.

FIG. 7 is an example of an operational description storing unit 17.

FIG. 8 is a flowchart showing a process for an interrupt activation unit 12 in the event that a flag is written to the interrupt activation condition flag storing unit 11.

FIG. 9 is a flowchart showing STEP S403 (shown in FIG. 8) in detail.

DETAILED DESCRIPTION OF EMBODIMENTS

Figure 1:
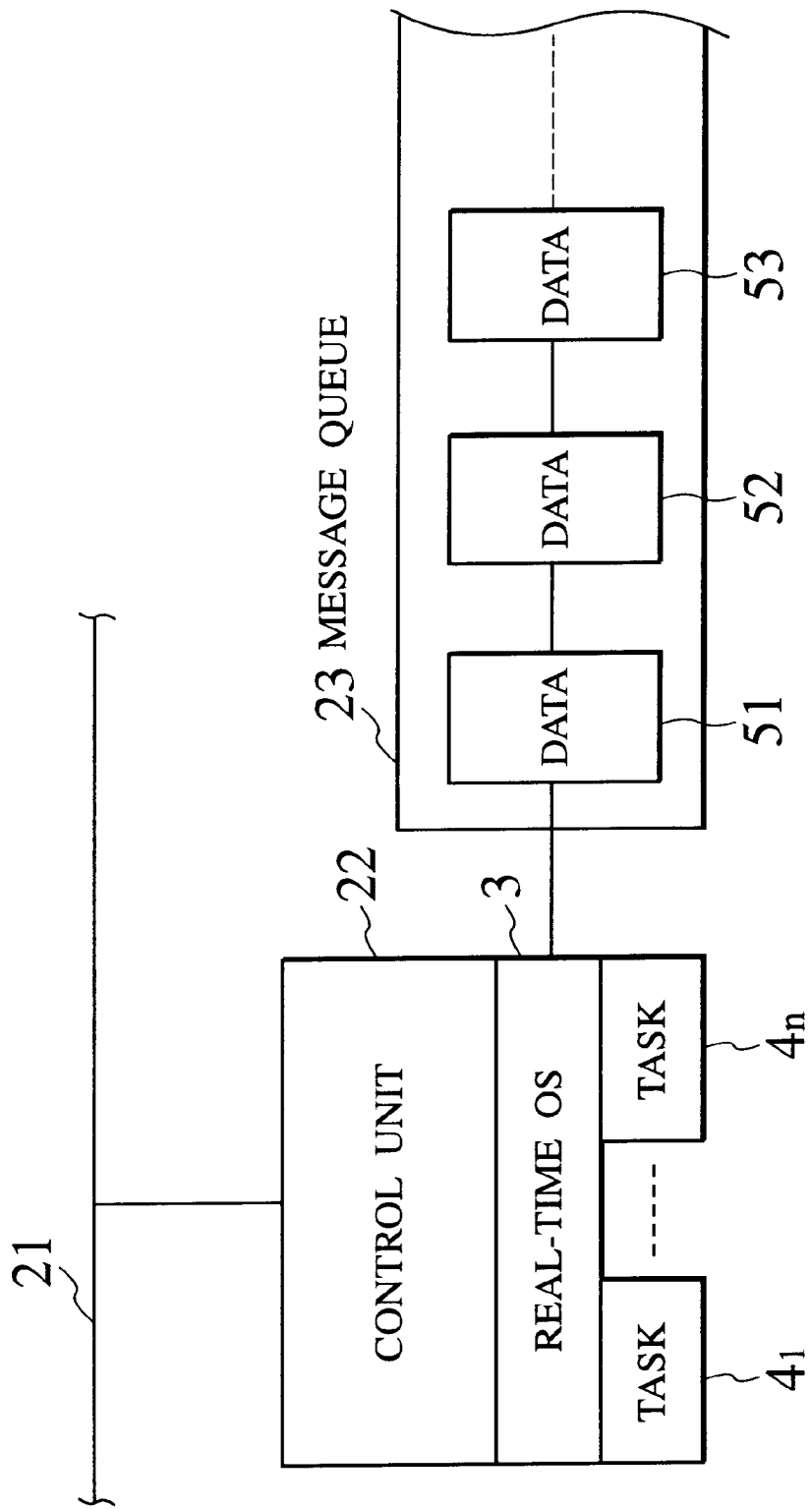
FIG. 1 is a block diagram for an example of the computer system configuration according to the related art.
Figure 2:
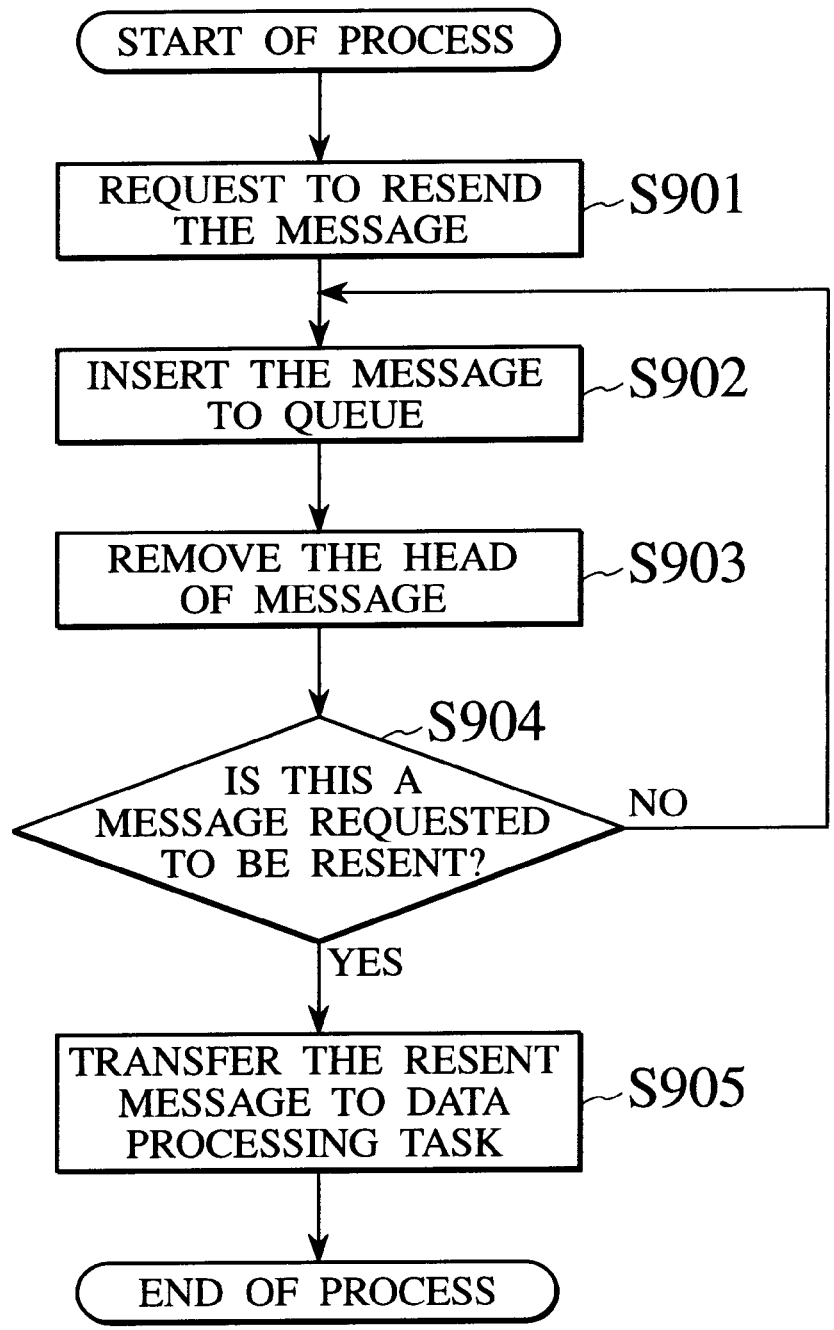
FIG. 2 is a flowchart showing processes of a real-time OS 3 and task in the related art.

Various embodiments of the present invention will be described with reference to the accompanying drawings. It is to be noted that same or similar reference numerals are applied to the same or similar parts and elements throughout the drawings, and the description of the same or similar parts and elements will be omitted or simplified.

Figure 3:
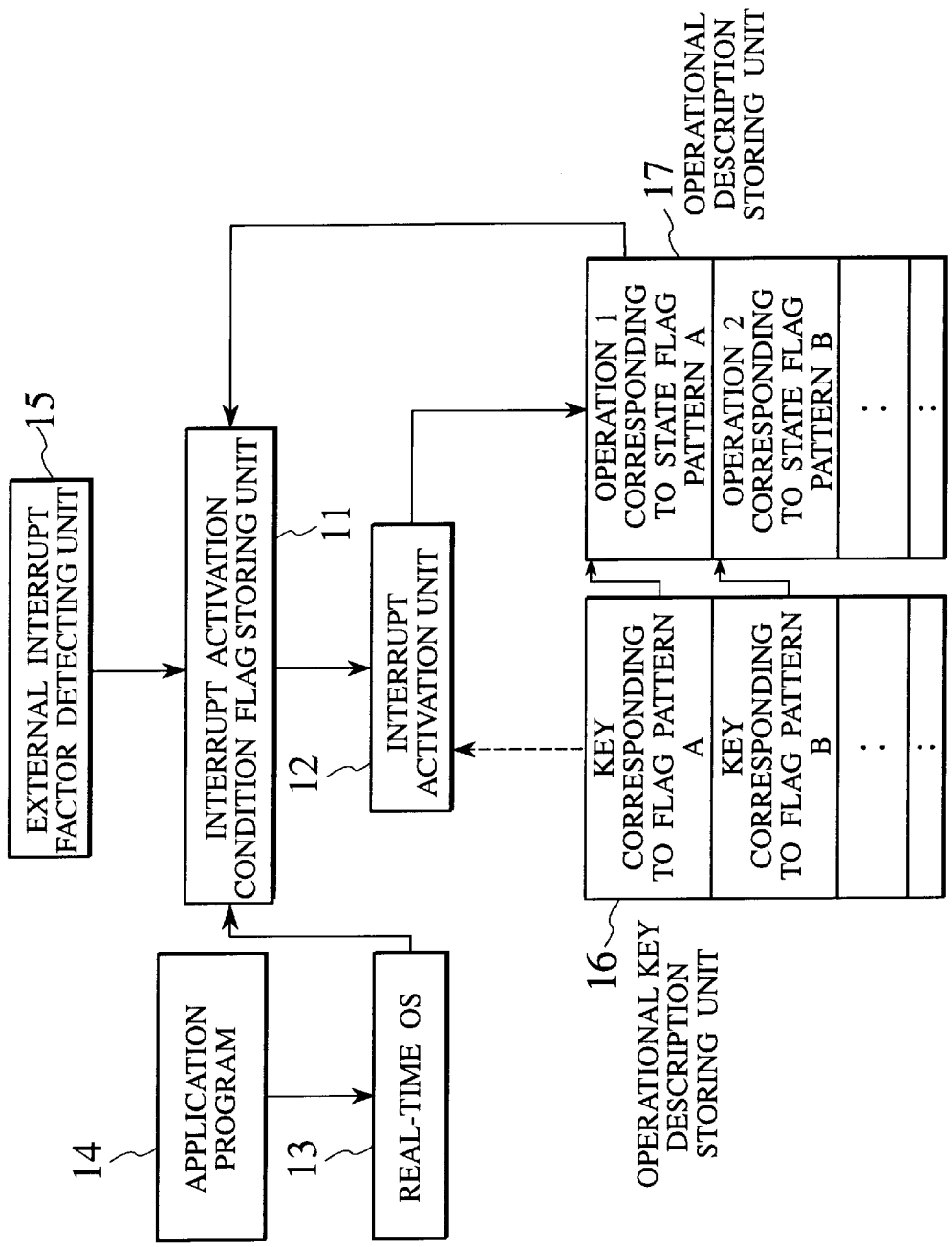
FIG. 3 is a block diagram showing the schematic configuration of a computer system according to the present invention.

FIG. 3 is a block diagram showing the schematic configuration of a computer system according to the present invention. Referring to FIG. 3, an interrupt activation condition flag storing unit 11 is a region for storing an interrupt activation condition flag, and the interrupt activation condition flag storing unit 11 includes a memory unit such as a register. The interrupt activation condition flag storing unit 11 is a region for storing an event occurrence due to an external interrupt factor and for storing the completion of a specific condition in a real-time OS 13.

A single event occurrence can be managed by at least one bit in the storing unit. The real-time OS 13 performs the flag operation on the interrupt activation condition flag storing unit 11. In other words, the real-time OS 13 writes data to the interrupt activation condition flag storing unit 11. For example, the real-time OS 13 is notified of the event from an application program 14. Upon being notified of the event, the real-time OS 13 performs the flag operation on a flag in the interrupt activation condition flag storing unit 11 when a specific condition is satisfied. Moreover, in the event that there occurs an interrupt factor such as an external equipment (not shown), a unit 15 equipped in this external equipment for detecting external interrupt factor performs the flag operation on the interrupt activation condition flag storing unit 11. The interrupt activation condition flag storing unit 11 notifies an interrupt activation unit 12 of occurrence of interrupt when the flag operation was performed.

When notified of the occurrence of an interrupt, the interrupt activation unit 12 refers to an operational key description storing unit 16. A key corresponding to the flag pattern in the interrupt activation condition flag storing unit 11 is being stored in the operational key description storing unit 16. The operational key description storing unit 16 stores data by which the operation described in an operational description storing unit 17 performs efficiently. For example, an address or label corresponding to the flag pattern of the interrupt activation condition flag storing unit 11 is described. An interrupt processing program corresponding to each specific pattern indicated by the interrupt activation condition flag storing unit 11 is described in the operational description storing unit 17. An address for each interrupt processing program is stored in the operational key description storing unit 16. The operational key description storing unit 16 as well as the operational description storing unit 17 are stored in memory means such as a memory or the like.

Next, an operation for a computer system according to an embodiment of the present invention is described. The computer system according to the embodiment is managed by a flag written in the interrupt activation condition flag storing unit 11. Thereby, the interrupt processes responsive to the combination of a plurality of events are executed independent of the real-time OS. In this embodiment, the event is meant to be the interrupt due to an undefined datum detected as well as external event.

Figure 4:
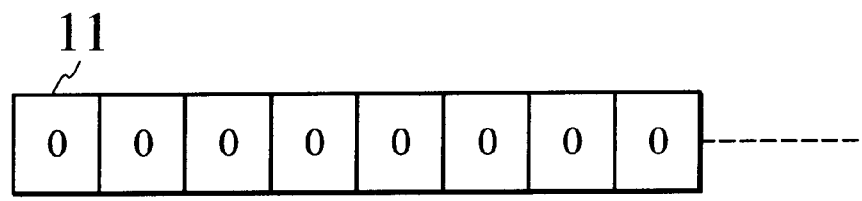
FIG. 4 shows an interrupt activation condition flag storing unit 11.

FIG. 4 shows an interrupt activation condition flag storing unit 11. Considered in the embodiment is a computer system which is equipped with a port for use with interrupt activation as shown in FIG. 4. This port for use with interrupt activation is considered as an interrupt activation condition flag storing unit. For example, that the interrupt activation condition flag storing unit 11 is of 16 bit means that the manageable events are 16. When the bit for the port is set due to a certain external factor, an interrupt corresponding to that position of the bit occurs. Moreover, this port can be written and read by a software, and the interrupt corresponding to the bit can occur also if the bit for the port is set by the software.

Figure 5:
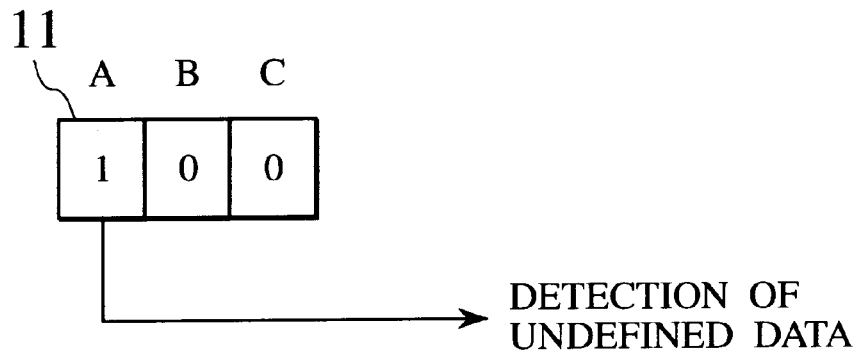
FIG. 5 shows an interrupt activation condition flag 11 according to an embodiment of the present invention.

FIG. 5 shows an interrupt activation condition flag storing unit 11 explained hereinbelow. Referring to FIG. 5, the interrupt activation condition flag storing unit 11 is taken as 3 bits for convenience. As shown in FIG. 5, let the flag storing unit be labeled A, B, and C in this order from the left to the right. "A" bit is a flag indicating whether or not an undefined data is detected . "B" bit is a flag indicating whether or not there is an external interrupt factor which occurred in a specific external equipment. First of all, the application program 14 requests a message from the real-time OS 13. When the message transferred from the real-time OS 13 is detected as being an undefined datum, the real-time OS 13 is notified accordingly. In this case, the real-time OS 13 writes a flag "1" to the "A" bit portion in the interrupt activation condition flag storing unit 11 shown in FIG. 5. When an external interrupt factor which occurred in the external equipment controlled by the application program 14 is detected by an external interrupt factor detecting unit 15, the external interrupt factor detecting unit 15 writes a flag "1" to the "B" bit portion in the interrupt activation condition flag storing unit 11 shown in FIG. 5.

In this embodiment, the messages need be replaced only when both the undefined data is detected and the external interrupt factor occurred . In other words, the messages are replacement-processed at the time the flag pattern in the interrupt activation condition flag storing unit 11 shown in FIG. 5 becomes "110" ( at the time both the undefined data is detected and the external interrupt factor occurred). See FIG. 9 where the replacement process is described in detail in STEP S703 in FIG. 9. In the event of the flag operation, the interrupt activation unit 12 refers to a key corresponding to the current flag pattern from the operational key description storing unit 16.

FIG. 6 is an example for an operational key description storing unit 16. Referring to FIG. 6, a label corresponding to a flag pattern in the interrupt activation condition flag storing unit 11 is described in the operational key description storing unit 16. For example, when the flag pattern is "001", a label indicating the location of the interrupt processing program corresponding to the pattern is described therein. Hence, if the assumed flag pattern was "110", an operation therefor is described in the position of the label flg110. Next, the interrupt activation unit 12 executes a program described in a label flg110.

FIG. 7 is an example of the operational description storing unit 17. Referring to FIG. 7, a program corresponding to the label flg110 is described in this operational description storing unit 17. Thus, the interrupt activation unit 12 executes this program as an interrupt process.

FIG. 8 is a flowchart showing a process for the interrupt activation unit 12 in the event that a flag is written to the interrupt activation condition flag storing unit 11. Referring to FIG. 8, first of all, the current flag pattern is examined (STEP S401). Thereafter, it is determined whether or not the current flag pattern is the assumed flag pattern (STEP S402). Determination therefor is based upon whether or not the flag pattern is described in the operational description storing unit 16. Thereafter, if the current flag pattern is the assumed flag pattern, an operation responsive to the flag is executed (STEP S403). Thereafter, the bit for the flag in the interrupt activation condition flag storing unit 11 responsive to the executed process is reset (STEP S404) so as to return from the interrupt process. If the current flag pattern is not the assumed flag pattern in STEP S402, then an original process is resumed and returns from the interrupt process.

FIG. 9 is a flowchart showing STEP S403 (shown in FIG. 8) in detail. Referring to FIG. 9, first of all, the request to re-send a message is carried out (STEP S701). After receiving the resent message as a result thereof, the head of a message in the message queue is removed (STEP S702). Thereafter, the resent message is inserted to the head in the message queue (STEP S703).

Hence, the interrupt process shown in the flowchart in FIG. 8 changed the performance of the real-time OS 13 without being restricted by the operation of the real-time OS 13, so that resent message is immediately transferred to the application program 14. The application program 14 performs the process by utilizing this resent message.

Accordingly, by employing the embodiment for the present invention where the resent message is inserted to the head of message in the message queue, there is no need for a search process in which messages are repeatedly replaced. Thereby, it becomes possible to estimate time for processing. Moreover, in spite of exceptional processes, desirable responsibility can be achieved. Thereby, the process is facilitated to be completed within a predetermined time period even if the process in question has a severe time constraint.

Moreover, by implementing the present invention where the events are administered and managed by the internal event of the real-time OS 13 and the external interrupt factors and the like, the processes independent of the real-time OS 13 can be performed regardless of internal condition within the real-time OS 13. Thereby, new features can be added without making changes in the real-time OS 13 and application program 14, moreover, the interrupt process due to combination of the events can be carried out with ease.

Though the external equipment is controlled by the application program 14 in the above-mentioned embodiment, it may be implemented independently of the application program 14.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for controlling a computer system having an interrupt handling capability therein, the method comprising the steps of:

storing, in an operational key description storing unit, a position of an operation responsive to a flag pattern stored in an interrupt activation condition flag storing unit;

storing, in an operational description storing unit, a process responsive to the flag pattern in the operational key description storing unit;

referring to the flag pattern in the interrupt activation condition flag storing unit which stores at least one event as an interrupt activating condition flag;

determining whether or not the flag pattern exists in the operational key description storing unit which stores an operational location responsive to the flag pattern in the interrupt activation condition flag storing unit;

performing an interrupt process in accordance with the operational description storing unit which stores a process responsive to the flag pattern, in the event that there exists the flag pattern in the determining step; and resetting a bit of a flag responsive to a process thus executed.

2. The method of claim 1, wherein the interrupt activation unit is activated independent of an operating system of the computer system.

3. The method of claim 1, wherein the flag operation unit includes an operating system which performs a flag operation when a predetermined event is received from an application program.

4. The method of claim 1, wherein the flag operation unit includes an external interrupt factor detecting unit configured to perform a flag operation when a specific event is received from an external device.

5. The computer system of claim 1, wherein the operational key description storing unit stores a label corresponding to a flag pattern in the interrupt activation condition flag storing unit.

6. A computer system having an interrupt handling capability therein, comprising:

means for storing an interrupt activation condition flag;

means for performing a flag operation on the interrupt activation condition flag in the event that occurrence of a predetermined event is detected; and means for executing an interrupt process responsive to a flag pattern in the interrupt activation flag storing unit, wherein the executing means comprises:

an operational key description storing unit for storing a position of an operation responsive to a flag pattern in the interrupt activation condition flag storing unit;

an operational description storing unit for storing a process responsive to the flag pattern in the operational key description storing unit; and an interrupt activation unit for referring to the operational key description storing unit based on the flag pattern in the interrupt activation condition flag storing unit and for processing a process thus described in the operational description storing unit.

7. A computer system having an interrupt handling capability therein, comprising:

an interrupt activation condition flag storing unit configured to store an interrupt activation condition flag;

a flag operation unit configured to perform a flag operation on the interrupt activation condition flag storing unit in the event that an occurrence of a predetermined event is detected; and an interrupt control unit configured to control and to execute an interrupt process responsive to a flag pattern in the interrupt activation condition flag storing unit, wherein the interrupt control unit includes:

an operational key description storing unit configured to store a position of an operation responsive to a flag pattern in the interrupt activation condition flag storing unit;

an operational description storing unit configured to store a process responsive to the flag pattern in the operational key description storing unit; and an interrupt activation unit configured to refer to the operational key description storing unit based on the flag pattern in the interrupt activation condition flag storing unit and to process a process thus described in the operational description storing unit.

8. The computer system of claim 7 wherein one bit is allocated and stored for a single event in the interrupt activation condition flag.

9. The computer system of claim 7, wherein the interrupt activation unit is activated independent of an operating system of the computer system.

10. The computer system of claim 7, wherein the flag operation unit includes an operating system which performs flag operation in the event that a predetermined event is received from an application program.

11. The computer system of claim 7, wherein the flag operation unit includes an external interrupt factor detecting unit which performs flag operation in the event that a specific event is received from an external equipment.

12. The computer system of claim 7, wherein the operational key description storing unit stores a label corresponding to a flag pattern in the interrupt activation condition flag storing unit.

13. The computer system of claim 7, wherein the operational description storing unit includes:

means for referring to a current flag pattern;

means for determining whether or not the current flag pattern is an assumed flag pattern;

means for executing a process responsive to the flag pattern in the event that the flag pattern is the assumed flag pattern; and means for resetting a bit of a flag in the interrupt activation flag storing unit.

14. The computer system of claim 13, wherein the process executing means includes:

means for requesting to re-send a message;

means for receiving the resent message from the requesting means and for removing a head message in a message queue; and means for putting the resent message to the head of the message queue.

* * * * *